(12) United States Patent
Zou (10) Patent No.: US 9,645,961 B2
(45) Date of Patent: May 9, 2017

(54) VIRTUAL MEDIA APPARATUS OF A SERVER AND ACCESS METHOD THEREOF

(71) Applicants: Inventec (Pudong) Technology Corporation, Shanghai (CN);
INVENTEC CORPORATION, Taipei (TW)

(72) Inventor: Xiao-Bing Zou, Shanghai (CN)

(73) Assignees: Inventec (Pudong) Technology Corporation, Shanghai (CN);
INVENTEC CORPORATION, Taipei (TW)

(*) Notice: Subject to any disclaimer, the term of this patent is extended or adjusted under 35 U.S.C. 154(b) by 690 days.

(21) Appl. No.: 14/070,576

(22) Filed: Nov. 3, 2013

(65) Prior Publication Data
US 2015/0074303 A1   Mar. 12, 2015

(30) Foreign Application Priority Data
Sep. 10, 2013   (CN) .......................... 2013 1 0410386

(51) Int. Cl.
*G06F 13/40*   (2006.01)
*G06F 13/42*   (2006.01)

(52) U.S. Cl.
CPC ...... *G06F 13/4022* (2013.01); *G06F 13/4286* (2013.01)

(58) Field of Classification Search
CPC .......................... G06F 13/4286; G06F 13/4022
See application file for complete search history.

(56) References Cited

U.S. PATENT DOCUMENTS

| | | | | |
|---|---|---|---|---|
| 5,345,447 A | * | 9/1994 | Noel | G06F 13/4022 370/362 |
| 5,530,813 A | * | 6/1996 | Paulsen | G06F 15/17375 710/100 |
| 5,621,899 A | * | 4/1997 | Gafford | G06F 13/36 710/119 |
| 6,289,015 B1 | * | 9/2001 | Warner | H04L 49/351 370/352 |
| 7,454,300 B2 | | 11/2008 | Suaya et al. | |
| 2006/0066338 A1 | | 3/2006 | Rajski et al. | |
| 2007/0122086 A1 | * | 5/2007 | Lin | H04B 10/40 385/88 |

(Continued)

FOREIGN PATENT DOCUMENTS

| | | |
|---|---|---|
| CN | 102566679 A | 7/2012 |
| CN | 202956752 U | 5/2013 |
| TW | 200928746 | 7/2009 |

*Primary Examiner* — Nimesh G Patel
(74) *Attorney, Agent, or Firm* — CKC & Partners Co., Ltd.

(57) ABSTRACT

A server system comprises base boards connected in series. Each base board is connected to virtual media apparatus. Each virtual media apparatus includes system-on-chips, a switch unit, a control unit and a programmable module. The switch unit couples with the system-on-chips through a serial bus. The control unit couples with the switch unit to transform a serial signal to an intranet signal. The programmable module couples with the switch unit and the control unit to receive a control signal generated by the control unit and generate a selecting signal according to the control signal. The selecting signal is transferred to the switch unit to select one of the system-on-chips to be connected to the control unit.

15 Claims, 5 Drawing Sheets

(56) References Cited

U.S. PATENT DOCUMENTS

| | | | |
|---|---|---|---|
| 2007/0198720 A1* | 8/2007 | Rucker | H04L 12/66 709/226 |
| 2007/0226386 A1* | 9/2007 | Sharp | G06F 13/385 710/62 |
| 2013/0089125 A1* | 4/2013 | Kim | H04L 12/2801 375/222 |
| 2014/0003442 A1* | 1/2014 | Hernandez | H04L 12/4641 370/401 |
| 2014/0006674 A1* | 1/2014 | Chan | G06F 13/4027 710/313 |
| 2014/0207984 A1* | 7/2014 | Maung | G06F 13/385 710/105 |

* cited by examiner

| $S_0$ | $S_1$ | EN | SOC |
|---|---|---|---|
| X | X | 0 | Disconnected |
| 0 | 0 | 1 | First SOC |
| 0 | 1 | 1 | Second SOC |
| 1 | 0 | 1 | Third SOC |
| 1 | 1 | 1 | Fourth SOC |

VIRTUAL MEDIA APPARATUS OF A SERVER AND ACCESS METHOD THEREOF

RELATED APPLICATIONS

This application claims priority to Chinese Application Serial Number 201310410386.9, filed Sep. 10, 2013, which is herein incorporated by reference.

BACKGROUND

Field of Invention

The invention relates to an apparatus and access method thereof, and particularly relates to a virtual media apparatus of a server system and an access method thereof.

Description of Related Art

A virtual media technology is a method to provide a server system, analogue to the access to a physical media apparatus of the server system itself, to access a physical media apparatus, e.g., a CD-ROM drive and a hard driver, or other physical or virtual media apparatus in a client computer. With the virtual media technology, a network administrator can use the software stored in the media apparatus in a client computer to remotely boot the server system or perform virus scanning for the server system. It is very convenient for the Internet manager to manage a number of server systems by the virtual media technology.

Therefore, it is a destination to use the virtual media technology in a server system with a plurality of central process units so as to accomplish the remote data access.

SUMMARY

An aspect of the invention provides a server system. The server system comprises base boards connected in series. Each base board is connected to virtual media apparatus. Each virtual media apparatus comprises system-on-chips (SOCs), a switch unit, a control unit and a programmable module. The switch unit couples with the system-on-chips through a serial bus. The control unit couples with the switch unit to transform a serial signal to an intranet signal. The programmable module couples with the switch unit and the control unit to receive a control signal generated by the control unit and generate a selecting signal according to the control signal. The selecting signal is transferred to the switch unit to select one of the system-on-chips to be connected to the control unit.

In an embodiment, each base board comprises a first network interface and a second network interface. The first network interface of the present base board is connected to a second network interface of a previous base board, and the second network interface of the present base board is connected to a first network interface of a next base board to make the base boards be in series.

In an embodiment, each virtual media apparatus further comprises a network converter coupling with the control unit. Each virtual media, apparatus is connected to a corresponding base board through the network converter.

In an embodiment, the base board further comprises a repeater. Each virtual media apparatus is connected to the repeater through the network converter. The repeater comprises a first repeater and a second repeater. The first repeater and the second repeater are connected in series. The first repeater is connected to the first network interface and the second repeater is connected to the second network interface.

In an embodiment, the control unit transforms the serial signal from the switch unit to an intranet signal.

In an embodiment, the selecting signal comprises an enable signal, a first selecting signal and a second selecting signal. The enable signal controls a connection between the control unit and the switch unit. The first selecting signal and the second selecting signal select one of the system-on-chips to be connected to the control unit. When the enable signal is enabled the switch unit is connected to the control unit.

Another aspect of the invention provides a virtual media apparatus in a server system. The virtual media apparatus comprises system-on-chips, a control unit, a switch unit and a programmable module. The control unit transforms a serial signal to an intranet signal. The switch unit couples with the system-on-chips through a serial bus and the control unit. The switch unit selects one of the system-on-chips to be connected to the control unit. The programmable module couples with the switch unit and the control unit to receive a control signal generated by the control unit and generate a selecting signal according to the control signal. The selecting signal is transferred to the switch unit. The switch unit selects one of the system-on-chips to be connected to the control unit according to the selecting signal, and the control unit transforms the serial signal form the switch signal to an intranet signal to output.

In an embodiment, the programmable module has at least one address signal end and an enable signal end. The selecting signal is outputted from the at least one address signal end, the enable signal end control a connection between the switch unit and the control unit.

In an embodiment, the switch unit is an USB repeater and the serial bus is an universal serial bus. The serial signal is an universal serial bus signal and the intranet signal is a media independent interface (MII) signal.

In an embodiment, the virtual media apparatus further comprises a network converter coupling with the control unit to transform the intranet signal to a differential signal to transfer to an Internet.

Another aspect of the invention provides a method for accessing a virtual media apparatus in a server system. The server system has system-on-chips to access a media apparatus at a remote client end. The method comprises to select one of the system-on-chips according to a control signal. Next, a serial signal generated by the selected system-on-chip is transformed to an intranet signal. Then, the intranet signal is transformed into a differential signal to be transferred in an Internet and connecting the selected system-on-chip to the remote client end through the Internet. Finally, a data in the media apparatus of the remote client end is accessed through the Internet.

In an embodiment, the serial signal is an universal serial bus signal and the intranet signal is a media independent interface (MII) signal.

In an embodiment, the step of selecting one of the system-on-chips according to a control signal further comprises to analyze the control signal to generate a selecting signal and an enable signal. One of the system-on-chips is selected according to the selecting signal, and the serial signal generated by the selected system-on-chip is outputted according to the enable signal.

In view of the above, the switch unit can select one of the SOCs to connect with the control unit and the network converter. Therefore, these SOCs can share a common USB to access a virtual media apparatus so as to simplify the structure of the server system.

DETAILED DESCRIPTION

Specific embodiments of the invention are described in details as follows with reference to the accompanying drawings, wherein throughout the following description and drawings, the same reference numerals refer to the same or similar elements and are omitted when the same or similar elements are stated repeatedly.

Figure 1:
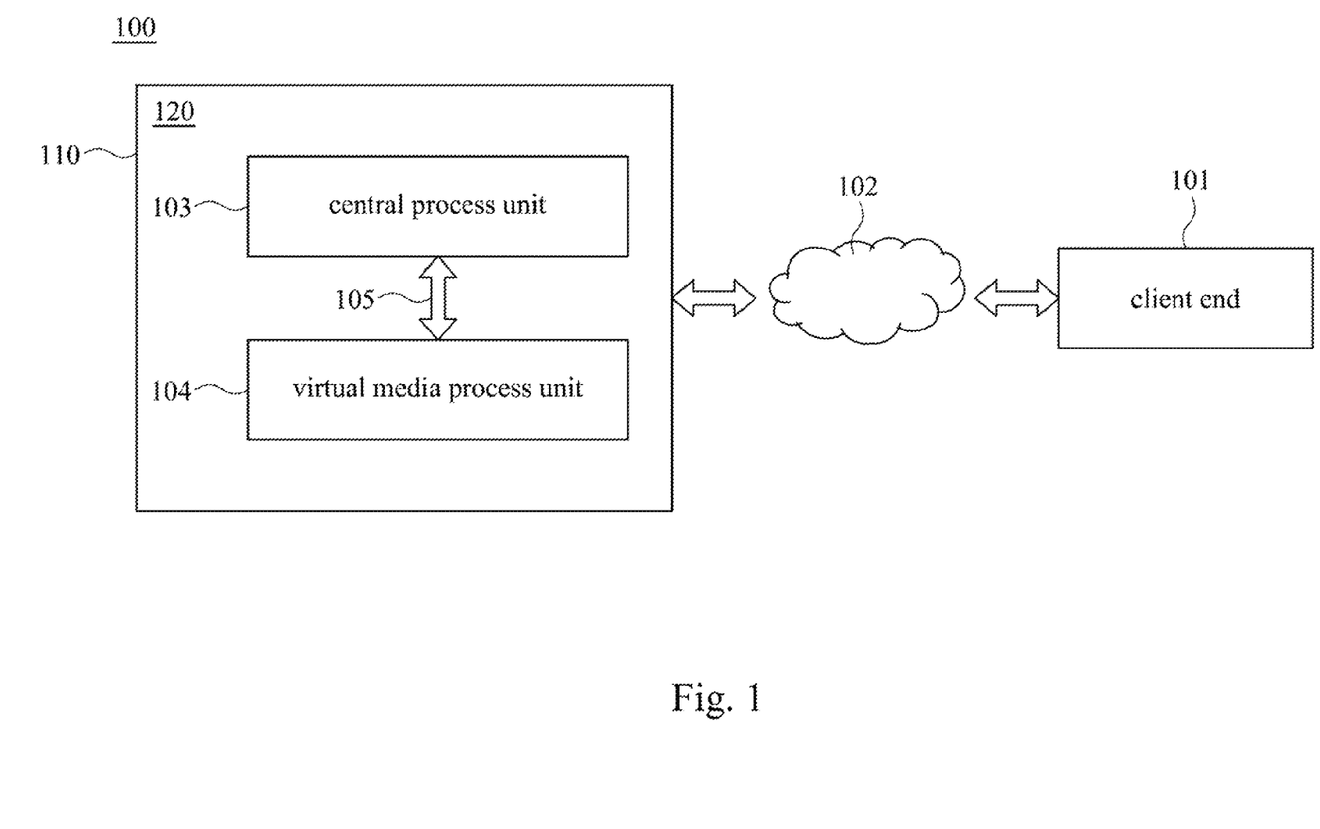
FIG. 1 illustrates a schematic view of a server system with a virtual media according to an embodiment of the invention.

FIG. 1 illustrates a schematic view of a server system with a virtual media apparatus according to an embodiment of the invention. A server system 100 of the invention includes a server 100 and a client end 101. The client end 101 includes a media apparatus. A virtual media apparatus 120 is disposed on a central process board 110 in the server 100 to make the server 100 communicate with the media apparatus in the client end 101. The virtual media apparatus 120 includes a central process unit 103 and a virtual media process unit 104. The central process unit 103 couples with the virtual media process unit 104 through a series bus 105. That is, a series bus protocol is used to communicate between the central process unit 103 and the virtual media process unit 104. In an embodiment, the serial bus 105 is a universal serial bus (USB). The central process unit 103 is a host and the virtual media process unit 104 is an USB apparatus in the universal serial bus. The server 100 communicates with the client end 101 through an Internet. In this embodiment, the server 100 communicates with the client end 101 through an Ethernet 102. By coupling with the virtual media process unit 104, the central process unit 103 can access a media apparatus in the client end 101 using a method of accessing an USB apparatus.

Figure 2:
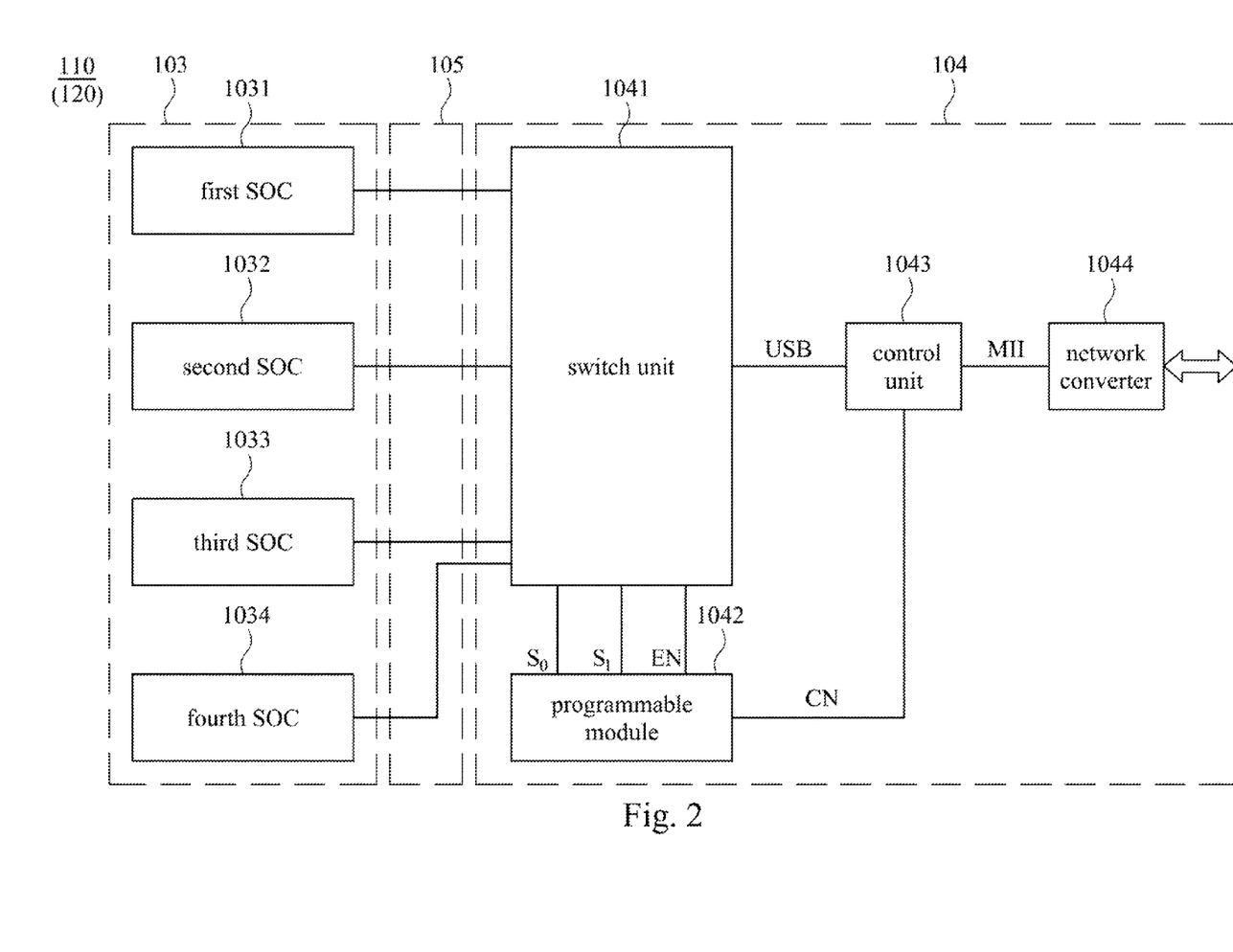
FIG. 2 illustrates a schematic view of a virtual media apparatus in a central process board of a server system according to an embodiment of the invention.

FIG. 2 illustrates a schematic view of a virtual media apparatus in a central process board in a server system according to an embodiment of the invention. The virtual media apparatus 120 includes a central process unit 103 and a virtual media process unit 104. The central process unit 103 couples with the virtual media process unit 104 through a series bus 105. A plurality of system-on-chips (SOC) disposed on a central process board 110 to server as the central process unit 103. In this embodiment, there are four SOCs, a first SOC 1031, a second SOC 1032, a third SOC 1033 and a fourth SOC 1034, are disposed on the central process board 110. However, in another embodiment, the number of the SOCs may be less or larger than four.

The virtual media process unit 104 includes a switch unit 1041, a programmable module 1042, a control unit 1043 and a network converter 1044. The switch unit 1041 couples with the first SOC 1031, the second SOC 1032, the third SOC 1033 and the fourth SOC 1034 in the central process unit 103 through the serial bus 105. The switch unit also couples with the control unit 1043. In an embodiment, the serial bus 105 is a universal serial bus (USB). The switch unit 1041 is a USB repeater. The programmable module 1042 controls the switch unit 1041 to select one of the first SOC 1031, the second SOC 1032, the third SOC 1033 and the fourth SOC 1034 to connect with the control unit 1043 to access a media apparatus in the client end 101. The programmable module 1042 couples with the switch unit 1041 and the control unit 1043. The programmable module 1042 receives and analyzes a control signal CN generated by the control unit 1043 to generate a selecting signal to switch the switch unit 1041 to select one of the first SOC 1031, the second SOC 1032, the third SOC 1033 and the fourth SOC 1034 to connect with the control unit 1043. The control unit 1043 couples with the switch unit 1041 and the programmable module 1042 to transform a data format and generate the control signal CN. The control unit 1043 transfers the control signal CN to the programmable module 1042 through a serial data bus.

In an embodiment, an USB protocol is used to transfer USB signal between the control unit 1043 and the switch unit 1041. However, an Intranet protocol is used to transfer intranet signal between the control unit 1043 and the network converter 1044. For compensating the difference of protocol, the control unit 1043 transforms the signal format between the switch unit 1041 and the network converter 1044. In an embodiment, the intranet signal is a Media Independent Interface (MII) signal. Therefore, the control unit 1043 transforms the USB signal to the Mil signal to transfer to the network converter 1044 or transforms the NI signal to the USB signal to transfer to the switch unit 1041. When the network converter 1044 receives the intranet signal from the control unit 1043, the network converter 1044 transforms the intranet signal to a 10/100 M differential signal to broadcast in Internet. On the other hand, when the network converter 1044 receives a differential signal from Internet, the network converter 1044 transforms the differential signal to the intranet signal to transfer to the control unit 1043. Then, the control unit 1043 further transforms the intranet signal to USB signal and a control signal CN to the switch unit 1041 and the programmable module 1042. In an embodiment, the programmable module 1042 is a complex programmable logic device (CPLD). The control unit 1043 is a microcontroller unit (MCU).

Figure 3:
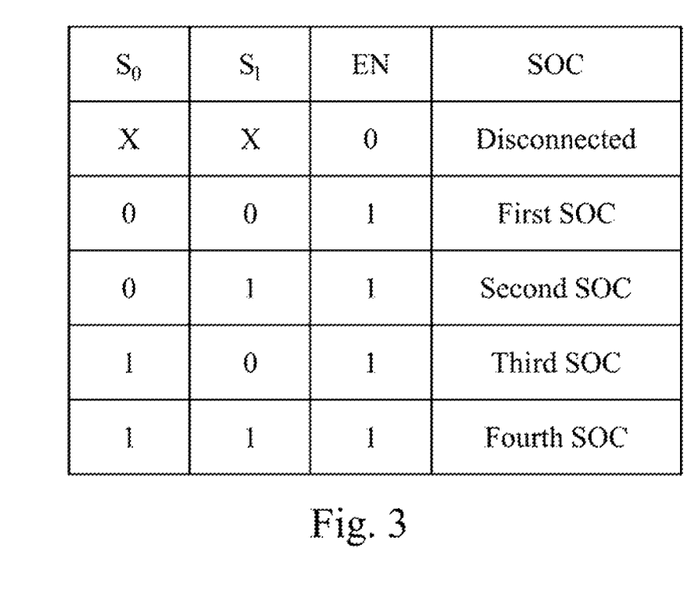
FIG. 3 illustrates a table including voltage levels of a first selecting signal S0, a second selecting signal S1 and an enable signal EN.

In an embodiment, the programmable module 1042 includes an address signal end and an enable signal end. The address signal end issues a selecting signal to control the switch unit 1041 to select one of the first SOC 1031, the second SOC 1032, the third SOC 1033 and the fourth SOC 1034. The enable signal end issues an enable signal EN to control the connection between the switch unit 1041 and the control unit 1043. In an embodiment, the selecting signal further comprises a first selecting signal S0 and a second selecting signal S1. When the enable signal is enabled, the switch unit is connected to the control unit. FIG. 3 illustrates a table including voltage levels of a first selecting signal S0, a second selecting signal S1 and an enable signal EN. In this embodiment, the programmable module 1042 outputs a low-level first selecting signal S0, a low-level second selecting signal S1 and a high-level enable signal EN to select the first SOC 1031 to couple with the control unit 1043. The programmable module 1042 outputs a low-level first selecting signal S0, a high-level second selecting signal S1 and a high-level enable signal EN to select the second SOC 1032 to couple with the control unit 1043. The programmable module 1042 outputs a high-level first selecting signal S0, a low-level second selecting signal S1 and a high-level enable signal EN to select the third SOC 1033 to couple with the control unit 1043. The programmable module 1042 outputs a high-level first selecting signal S0, a high-level second selecting signal S1 and a high-level enable signal EN to select the fourth SOC 1034 to couple with the control unit 1043. The programmable module 1042 outputs a low-level enable signal EN to disconnect the switch unit 1041 and the control unit 1043. The programmable module 1042 outputs a low-level enable signal EN to disconnect the switch unit 1041 and the control unit 1043. Accordingly, the switch unit 1041 can select one of the SOCs to connect with the control unit 1043. Therefore, these SOCs can share a common USB to access a virtual media apparatus to simplify the structure of the server system.

Figure 4:
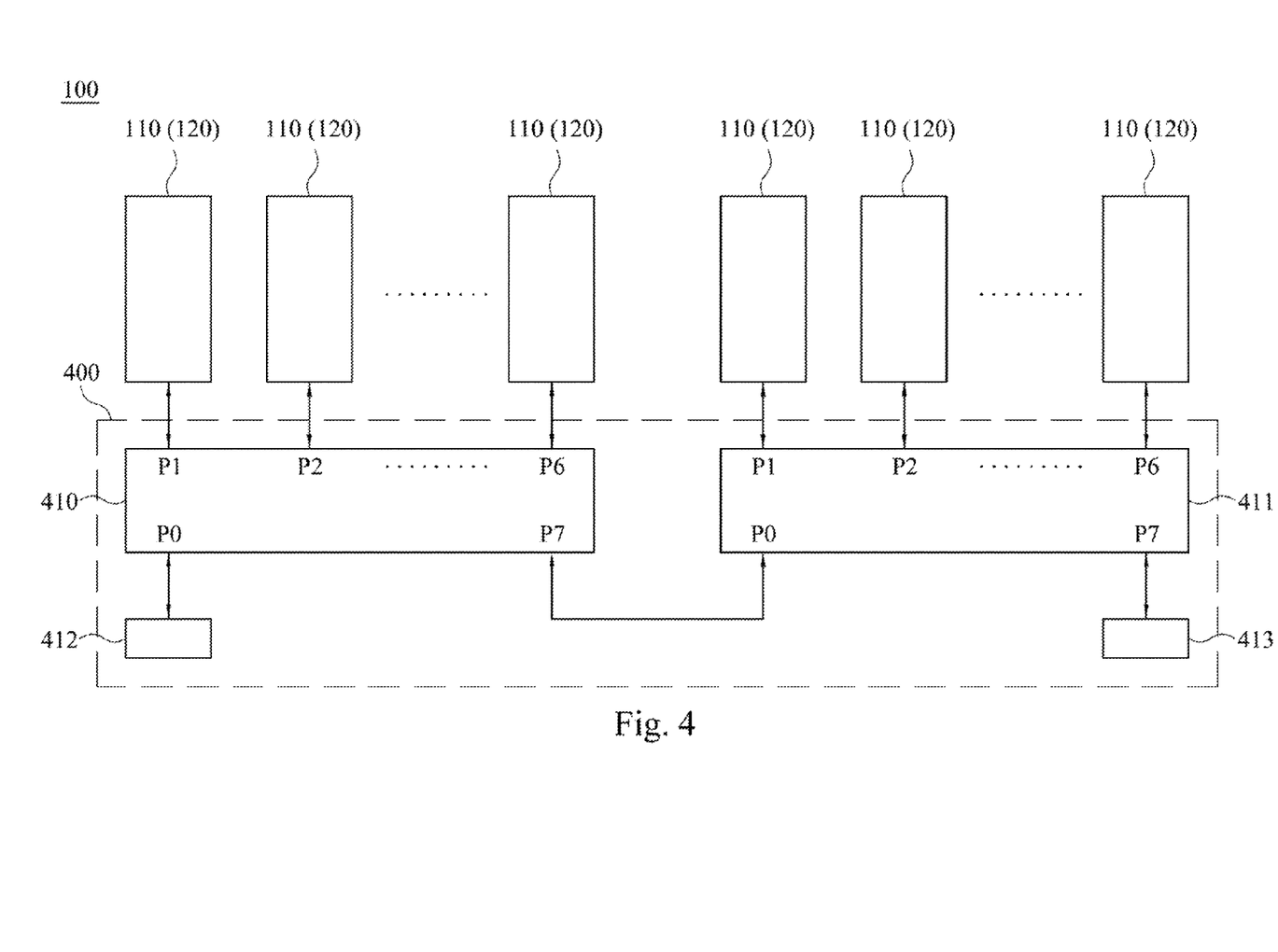
FIG. 4 illustrates a schematic view of a server system according to an embodiment of the invention.

FIG. 4 illustrates a schematic view of a server system according to an embodiment of the invention. The server system 100 has a plurality of virtual media apparatus 120 disposed on central process boards 110. These virtual media apparatus 120 are connected to Internet through repeaters 410 and 411 disposed in a base board 400 of the server system 100. Each central process board 110 with a corresponding virtual media apparatus 120 is connected to a corresponding repeater 410 or 411 through its network converter 1044. In an embodiment, two repeaters 410 and 411 are disposed in a base board 400. Each repeater 410 and 411 has eight ports P0-P7. Two repeaters 410 and 411 may provide twelve ports P1-P6 to connect to twelve central process boards respectively. The P7 port of the repeater 410 is connected to the P0 port of the repeater 411 to make the repeater 410 and the repeater 411 in series. The P0 port of the repeater 410 is coupled to an Network interface 412. The P7 port of the repeater 411 is coupled to an Network interface 413. Each virtual media apparatus 120 in a central process board 110 is connected to Internet through the Network interface 412. Therefore, the client end 101 may remote access and control one of the virtual media apparatus 120. Because these central process boards 110 can share a common Network interface 412 to connect to Internet, the Internet connection structure of the server system is much simplified. On the other hand, the base board 400 is also connected to other base boards in the server system 100 through the Network interfaces 412 and 413 to make these repeaters disposed in different base boards be in series. For example, the previous base board is connected to the present base board 400 through the Network interfaces 412 to make these two base boards be in series. The next base board is connected to the present base board 400 through the Network interfaces 413 to make these two base boards be in series. Accordingly, the density of the central process board 110 disposed in the server system 100 can be increased. The number of the central process board 110 that the client end 101 can visit is also increased. In an embodiment, the Network interfaces 412 and 413 are RJ-45 interfaces.

Figure 5:
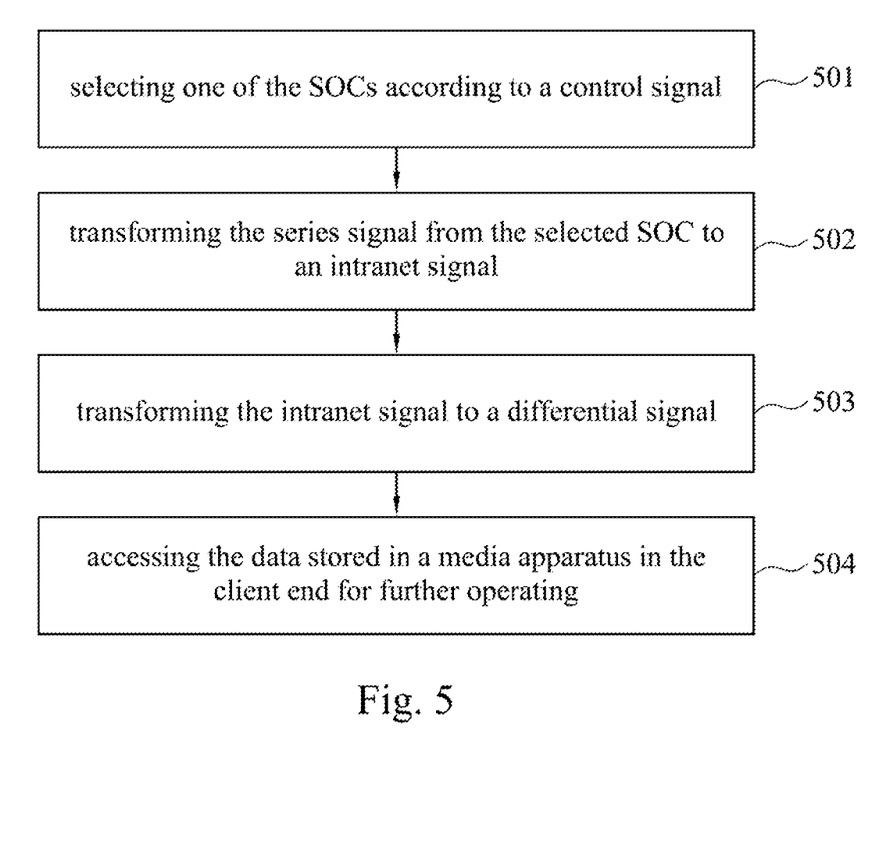
FIG. 5 illustrates a flow chart for accessing a vi media apparatus according to an embodiment of the invention.

FIG. 5 illustrates a flow chart for accessing a virtual media apparatus according to an embodiment of the invention. Please also refer to FIG. 2 and FIG. 5. In step 501, one of the SOCs is selected according to a control signal. In an embodiment, the programmable module 1042 receives a control signal CN generated by the control unit 1043 to switch the switch unit 1041 to select one of the first SOC 1031, the second SOC 1032, the third SOC 1033 and the fourth SOC 1034 to connect with the control unit 1043. In step 502, the series signal from the selected SOC is transformed to an intranet signal. In an embodiment, the USB signal is transformed to an intranet signal by the control unit 1043. Next, in step 503, the intranet signal is transformed to a differential signal to broadcast to an Internet. Then, the selected SOC can be connected to a client end with a media apparatus through the Internet. In an embodiment, when a network converter 1044 receives the intranet signal from the control unit 1043, the network converter 1044 transforms the intranet signal to a 10/100 M differential signal to broadcast in Internet. Finally, in step 504, the data stored in a media apparatus in the client end is accessed for further operating. For example, the central process unit 103 can access the media apparatus in the client end 101 using a method of accessing an USB apparatus.

In view of the above, the switch unit can select one of the SOCs to connect with the control unit and the network converter. Therefore, these SOCs can share a common USB to access a virtual media apparatus to simplify the structure of the server system. Moreover, central process boards are connected to repeaters in base board to share a common Network interface to connect to Internet, the Internet connection structure of the server system is much simplified. The density of the central process board disposed in the server system can be increased. The number of the central process board that the client end can visit is also increased.

Although the invention has been disclosed with reference to the above embodiments, these embodiments are not intended to limit the invention. It will be apparent to those of skills in the art that various modifications and variations can be made without departing from the spirit and scope of the invention. Therefore, the scope of the invention shall be defined by the appended claims.

What is claimed is:

1. A server system, comprising:
   a plurality of base boards connected in series, each base board connected to a plurality of virtual media apparatus, wherein each of the virtual media apparatus comprises:
   a plurality of system-on-chips;
   a switch unit coupling with the system-on-chips through a serial bus;
   a control unit coupling with the switch unit to transform a serial signal to an intranet signal; and
   a programmable module coupling with the switch unit and the control unit to receive a control signal generated by the control unit and generate a selecting signal according to the control signal, wherein the selecting signal is transferred to the switch unit to select one of the system-on-chips to be connected to the control unit.

2. The server system of claim 1, wherein each of the base boards comprises:
   a first network interface; and
   a second network interface, wherein the first network interface of the present base board is connected to a second network interface of a previous base board, and the second network interface of the present base board is connected to a first network interface of a next base board to make the base boards be in series.

3. The server system of claim 2, wherein each of the virtual media apparatus further comprises a network converter coupling with the control unit, and each of the virtual media apparatus is connected to a corresponding base board through the network converter.

4. The server system of claim 3, wherein the base board further comprises a repeater, and each of the virtual media apparatus is connected to the repeater through the network converter.

5. The server system of claim 4, wherein the repeater comprises a first repeater and a second repeater, wherein the first repeater and the second repeater are connected in series, the first repeater is connected to the first network interface, and the second repeater is connected to the second network interface.

6. The server system of claim 1, wherein the control unit transforms the serial signal from the switch unit to an intranet signal.

7. The server system of claim 1, wherein the selecting signal comprises an enable signal, a first selecting signal and a second selecting signal, wherein the enable signal controls a connection between the control unit and the switch unit, and the first selecting signal and the second selecting signal select one of the system-on-chips to connect to the control unit.

8. The server system of claim 7, wherein, when the enable signal is enabled, the switch unit is connected to the control unit.

9. The server system of claim 1, wherein a client end is connected to the server system through an internet, the client end includes a media apparatus accessible to the server system.

10. The server system of claim 9, wherein the internet is an Ethernet.

11. A virtual media apparatus in a server system, comprising:
   a plurality of system-on-chips;
   a control unit to transform a serial signal to an intranet signal;
   a switch unit coupling with the system-on-chips through a serial bus and the control unit, wherein the switch unit selects one of the system-on-chips so as to be connected to the control unit; and
   a programmable module coupling with the switch unit and the control unit to receive a control signal generated by the control unit and generate a selecting signal according to the control signal, wherein the selecting signal is transferred to the switch unit;
   wherein the switch unit selects one of the system-on-chips to be connected to the control unit according to the selecting signal, and the control unit transforms the serial signal from the switch signal to an intranet signal for outputting.

12. The virtual media apparatus of claim 11, wherein the programmable module has at least one address signal end and an enable signal end, wherein the selecting signal is outputted from the at least one address signal end, and the enable signal end controls a connection between the switch unit and the control unit.

13. The virtual media apparatus of claim 11, wherein the switch unit is an USB repeater and the serial bus is an universal serial bus.

14. The virtual media apparatus of claim 11, wherein the serial signal is an universal serial bus signal and the intranet signal is a media independent interface (MII) signal.

15. The virtual media apparatus of claim 11, further comprising a network converter coupling with the control unit to transform the intranet signal to a differential signal to transfer to an Internet.

* * * * *